M. INGERSOLL.
Car Brake.
No. 53,006.  Patented Mar. 6, 1866.
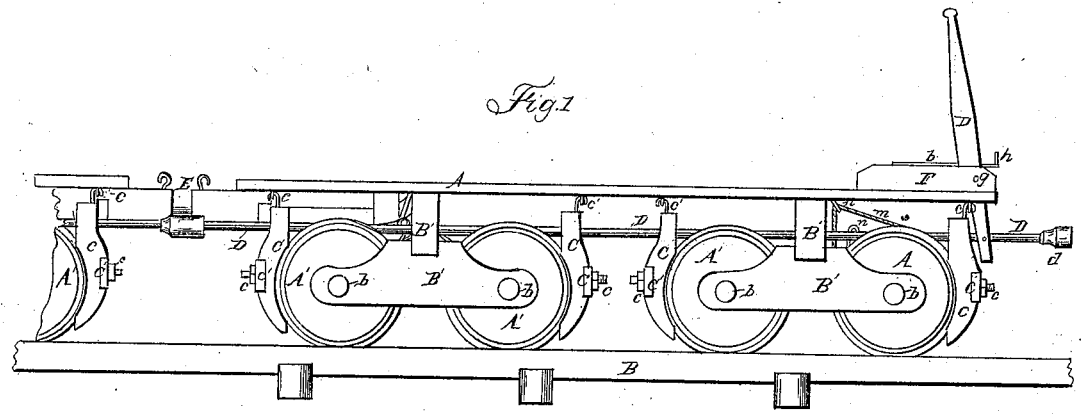
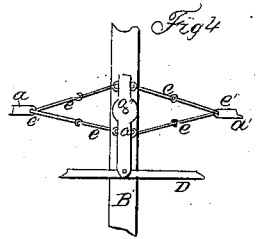
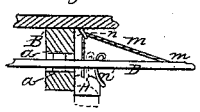
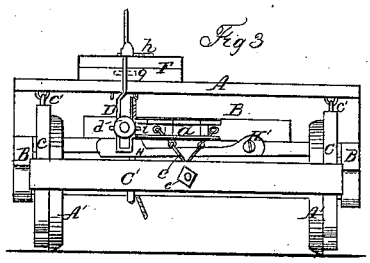
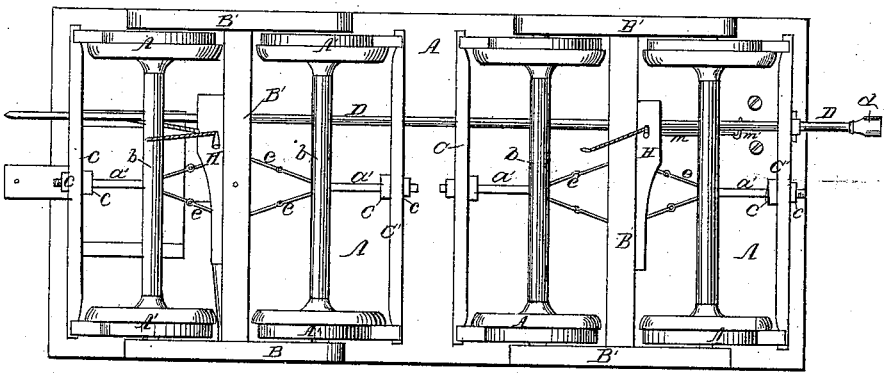
WITNESSES
W. H. Burridge
Frank Alden
INVENTOR.
M. Ingersoll

UNITED STATES PATENT OFFICE.

MARSHAL INGERSOLL, OF GRAFTON, OHIO.

IMPROVED RAILROAD-CAR BRAKE.

Specification forming part of Letters Patent No. 53,006, dated March 6, 1866.

*To all whom it may concern:*

Be it known that I, M. INGERSOLL, of Grafton, in the county of Lorain and State of Ohio, have invented certain new and useful Improvements in Railroad-Brakes; and I do hereby declare that the following is a full and complete description of the construction and operation of the same, reference being had to the accompanying drawings, making a part of this specification, in which—

Figure 1 is the side view of railroad-car trucks with the brake attached. Fig. 2 is a view of the under side of the same. Fig. 3 is an end view. Figs. 4 and 5 are detached sections, that will be referred to in the description.

Like letters of reference refer to like parts in the several views.

My improvement relates to railroad-brakes, as hereinafter described.

A represents the platform of the car; A', the wheels that rest on the rail; B, the axles b of the wheels. (Shown in Fig. 2.) B' shows the frame-work of the wheels. In a part of this frame rests the lever a, being pivoted to it, as shown at a'' in Fig. 4, allowing either end of the lever to turn.

C are shoes that are pendent, being hung, as shown at c', to the under side of the platform A. These shoes are connected by means of bars C', (shown in Fig. 2,) the bars extending from the shoe on one side to the shoe on the opposite side. Through the center of these bars pass bolts a', which are held in place by means of the nuts c, one on each side of the bar C'. To one end of the bolts are connected links or chains e, the connections being shown at e', in Fig. 4.

D represents a rod that is moved by means of the lever D', which is pivoted to it, the end of the lever being turned up and the rod passing through it and held by means of the pin i. (Seen in Fig. 3.) The lever D' passes up through a projection or piece, F, in which it has its fulcrum. (Seen at g.)

h is a ratchet for the purpose of holding the lever in place.

On the end of the rod D is a socket, d, that receives the end of the rod which is attached to the brake of the next car, as shown in Fig. 1.

The coupling of the cars, which is shown at E, can be of the usual form.

The lever D' is turned by hand, thus moving the rod D back and forth. This rod passes through the long arm of the lever a, being pivoted to it. Thus when the rod is moved back or forth the lever is caused to move in the same direction turning on the pivot a'', where it is attached to the frame B' of the wheels.

The links e, that are attached to the bolts a', which bolts are connected to bars C', as before stated, are fastened to the lever a, as shown in Fig. 4.

When the rod D is moved backward or forward by means of the lever D' it brings or presses the shoes close up against the wheels. To this rod is attached a cord, m, by means of the pin m', which cord passes from the pin m' up through an eyelet, n, on the under side of the platform A, and then down and is attached to the cam H. As the rod moves back the pin n' moves onto the cam H, the cord loosening as the rod moves back, and allows the pin to press the cam down as indicated by the dotted line in Fig. 5. This cam H is pivoted at one end to the frame B', as shown at H' in Fig. 3, thus allowing the other end to be moved up or down, as stated. When the rod is moved forward it pulls on the cord, which, being attached to the cam, raises it, as in Fig. 5.

At the other end of the platform is a similar arrangement, the cams moving up and down alternately. In this manner the pin n' sliding onto the cam H so easily, and the rod moving back, it stops all jerking and jarring of the rod and brake, and there is no fear of the rod being cramped or broken by being moved back quickly, and prevents all noise and rattle caused by the ordinary mode of brakes.

This brake will stop the cars by moving the lever either way, as indicated, or in the direction of the dotted lines, the wheels being free when the lever stands vertical, or it can be extended through and operated by the engineer.

A hand-wheel or windlass can be used instead of the lever D', as in the ordinary way.

What I claim as my improvement, and desire to secure by Letters Patent, is—

1. The cam H, cord m, and pin n', in combination with the lever a, rod D, and links e, when arranged and operating in the manner and for the purpose set forth.

2. In combination with the above, the socket d, rod D, bolts a', shoes C, and lever D', when arranged in the manner and for the purpose described.

MARSHAL INGERSOLL.

Witnesses:
W. H. BURRIDGE,
J. HOLMES.